United States Patent
Kim

(10) Patent No.: US 10,925,016 B2
(45) Date of Patent: Feb. 16, 2021

(54) APPARATUS AND METHOD FOR TIME SYNCHRONIZATION IN WIRELESS COMMUNICATION SYSTEM

(71) Applicant: SAMSUNG ELECTRONICS CO., LTD., Suwon-si (KR)

(72) Inventor: Deok-hwan Kim, Pyeongtaek-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 432 days.

(21) Appl. No.: 15/718,812

(22) Filed: Sep. 28, 2017

(65) Prior Publication Data

US 2018/0103444 A1    Apr. 12, 2018

(30) Foreign Application Priority Data

Oct. 7, 2016 (KR) .................... 10-2016-0129876
Feb. 14, 2017 (KR) .................... 10-2017-0020137

(51) Int. Cl.
*H04W 56/00* (2009.01)
*H04W 92/10* (2009.01)

(52) U.S. Cl.
CPC .......... *H04W 56/001* (2013.01); *H04W 92/10* (2013.01)

(58) Field of Classification Search
CPC ........ H04W 56/00–0095; H04W 92/10; H04L 7/00; H04L 7/0054–007; H04L 7/0079–0087; H04L 7/033–0338; H04L 7/06; H04L 27/2655–2672
See application file for complete search history.

(56) References Cited

U.S. PATENT DOCUMENTS

| | | | |
|---|---|---|---|
| 5,838,672 A | 11/1998 | Ranta | |
| 6,885,693 B1 | 4/2005 | Burton | |
| 7,974,647 B2 | 7/2011 | Ho | |
| 2004/0109508 A1* | 6/2004 | Jeon | H04L 27/2657 375/260 |
| 2004/0184551 A1* | 9/2004 | Liu | H04L 27/2662 375/260 |
| 2005/0008040 A1* | 1/2005 | Becker | H04B 1/70754 370/503 |
| 2005/0036254 A1* | 2/2005 | Premerlani | H02H 3/302 361/69 |
| 2005/0180461 A1* | 8/2005 | Kao | H04L 25/03159 370/480 |
| 2005/0238060 A1 | 10/2005 | Kuntz et al. | |
| 2006/0187816 A1* | 8/2006 | Kim | H04L 27/2662 370/208 |
| 2007/0041312 A1* | 2/2007 | Kim | H04L 27/2662 370/208 |

(Continued)

FOREIGN PATENT DOCUMENTS

KR    10-2014-0010689 A    1/2014

*Primary Examiner* — Un C Cho
*Assistant Examiner* — Kenan Cehic
(74) *Attorney, Agent, or Firm* — Sughrue Mion, PLLC

(57) ABSTRACT

An apparatus and a method for time synchronization are provided. The method may include estimating a sampling time offset caused by a sampling frequency of an input signal received through a wireless channel; estimating a channel time offset caused by the wireless channel; and compensating a time offset in a time offset compensation unit for time synchronization with a transmitter of an input signal based on a sampling time offset and a channel time offset.

14 Claims, 10 Drawing Sheets

(56) References Cited

U.S. PATENT DOCUMENTS

| | | | |
|---|---|---|---|
| 2007/0182604 A1* | 8/2007 | Aerts | H04L 27/3881 341/118 |
| 2007/0286062 A1* | 12/2007 | Gupta | H04L 27/261 370/203 |
| 2008/0069252 A1* | 3/2008 | Wenzhen | H04L 27/2675 375/260 |
| 2008/0095250 A1* | 4/2008 | Kim | H04L 27/2675 375/260 |
| 2009/0190702 A1* | 7/2009 | Shaw | H04L 7/0029 375/355 |
| 2010/0142609 A1* | 6/2010 | Ban | H04B 7/0689 375/232 |
| 2014/0029633 A1 | 1/2014 | Hamamatsu et al. | |
| 2016/0127066 A1* | 5/2016 | Jose | H04W 56/0075 370/350 |

* cited by examiner

APPARATUS AND METHOD FOR TIME SYNCHRONIZATION IN WIRELESS COMMUNICATION SYSTEM

CROSS-REFERENCE TO RELATED APPLICATIONS

This application claims priority from Korean Patent Application No. 10-2016-0129876, filed on Oct. 7, 2016 and, Korean Patent Application No. 10-2017-0020137, filed on Feb. 14, 2017, in the Korean Intellectual Property Office, the disclosures of which are incorporated herein in their entirety by reference.

BACKGROUND

Apparatuses and methods consistent with the present disclosure relate to wireless communication, and more particularly, to an apparatus and a method for time synchronization.

In a wireless communication system, a base station (e.g., Node B) and a user equipment (UE) may be time synchronized for transmitting and receiving a signal, and the time synchronization may be maintained by transmitting and receiving a predetermined signal. For example, a delay may be experienced when a signal transmitted from the base station passes through a wireless channel, and the user equipment may adjust time synchronization with the base station by estimating the delay occurred by the received signal. Such time synchronization requires high accuracy and high efficiency, along with low electrical power consumption and low cost, and, particularly, in the case of the user equipment, low electrical power consumption and low cost may be important requirements.

SUMMARY

Example embodiments provide an apparatus and a method for time synchronization in a wireless communication system.

According to an aspect of the inventive concept, there is provided an apparatus for wireless communication, the apparatus including: a sampling time offset estimator configured to estimate a sampling time offset caused by a sampling frequency used in sampling an input signal received through a wireless channel, and to generate a first control signal based on the sampling time offset that is estimated; a channel time offset estimator configured to estimate a channel time offset caused by the wireless channel, and to generate a second control signal based on the channel time offset that is estimated; a time control signal generator configured to generate a time control signal based on the first control signal or the second control signal; and a time offset compensator configured to compensate for a time offset of the input signal, based on the time control signal, for time synchronization with a transmitter of the input signal.

According to an aspect of another example embodiment, there is provided a method of wireless communication, the method including estimating a sampling time offset caused by a sampling frequency of an input signal received through a wireless channel; estimating a channel time offset caused by the wireless channel; and compensating for a time offset of the input signal, based on the sampling time offset and the channel time offset, for time synchronization with a transmitter of the input signal.

According to an aspect of another example embodiment, there is provided an apparatus for wireless communication, the apparatus including: a time offset estimator configured to determine an estimated sampling time offset caused by a sampling clock used to sample an input signal received through a wireless channel, to determine an estimated channel time offset caused by the wireless channel, and to generate a control signal based on the estimated sampling time offset and the estimated channel time offset; and a time offset compensator configured to generate a time compensated signal by compensating for a time offset of the input signal, based on the control signal, for time synchronization with a transmitter that transmitted the input signal.

BRIEF DESCRIPTION OF THE DRAWINGS

The above and other aspects will be more clearly understood from the following detailed description of example embodiments taken in conjunction with the accompanying drawings in which.

DETAILED DESCRIPTION

Figure 1:
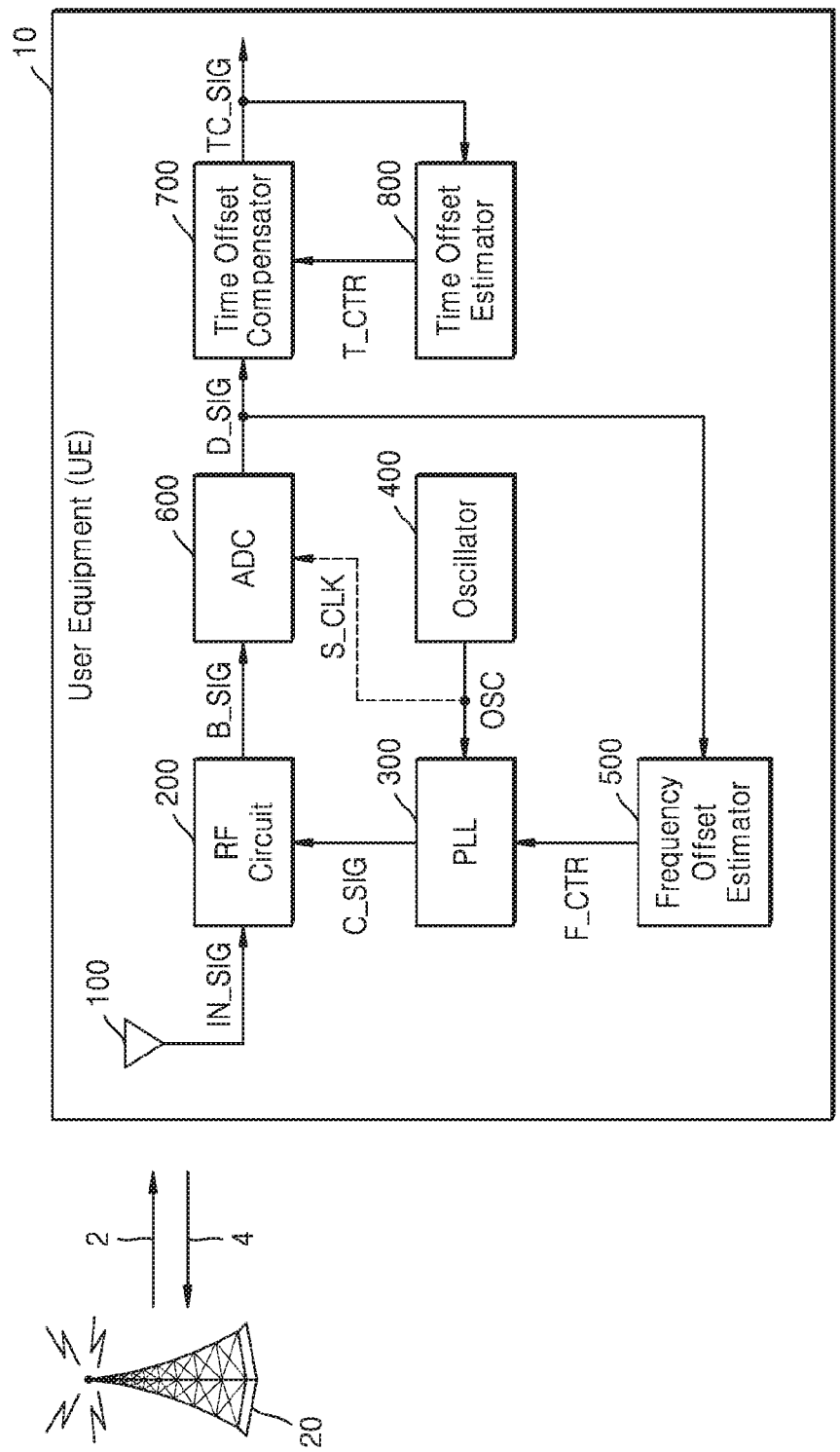
FIG. 1 is a block diagram of a wireless communication system including a user equipment and a base station, according to an example embodiment.

FIG. 1 is a block diagram of a wireless communication system that includes a user equipment (UE) 10 and a base station (BS) 20 according to an example embodiment. As shown in FIG. 1, the user equipment 10 and the base station 20 may communicate through a downlink (DL) channel 2 and an uplink (UL) channel 4.

The user equipment (UE) 10 is a wireless communication device that may be fixed or movable and may be various devices that may transmit and receive data and/or control information by communicating with the base station 20. For example, the user equipment 10 may be also referred to as a terminal equipment, a mobile station (MS), a mobile terminal (MT), a user terminal, a subscriber station (SS), a wireless device, or a handheld device. The base station 20 may generally be a fixed station that communicates with a user equipment and/or another base station and may exchange data or control information by communicating with a user equipment and/or another base station. For example, the base station 20 may be also referred to as a Node B, an evolved-Node B (eNB), a base transceiver system (BTS), and an access point (AP).

A wireless communication network communicably linking the user equipment 10 and the base station 20 shares available network resources and thus may support communication of a plurality of users. For example, in the wireless communication network, information may be transmitted by using various methods such as code division multiple access (CDMA), frequency division multiple access (FDMA), time division multiple access (TDMA), orthogonal frequency division multiple access (OFDMA), or single carrier frequency division multiple access (SC-FDMA).

The user equipment 10 may receive a signal transmitted from the base station 20 through the DL channel 2. The DL channel 2 may have characteristics that change as time goes by due to states of the user equipment 10 and the base station 20 and/or surrounding circumstances, and the signal received by the user equipment 10 through the DL channel 2 may experience delay. The user equipment 10 may estimate the signal delay, and the signal delay may be compensated based on the estimated signal delay. The signal delay caused by the DL channel 2 may be referred to as a channel time offset.

Referring to FIG. 1, the user equipment 10 may include an antenna 100, a radio frequency (RF) circuit 200, a phase locked loop (PLL) 300, an oscillator 400, a frequency offset estimator 500, an analog-digital converter (ADC) 600, a time offset compensator 700, and a time offset estimator 800. Each of these elements included in the user equipment 10 may be a hardware block that includes a processor, an analog circuit and/or a digital circuit and/or may be a software block that includes a plurality of commands that are executed by a processor or the like.

The RF circuit 200 may receive an input signal IN_SIG transmitted by the base station 20 through the antenna 100 and may receive a carrier signal C_SIG from the PLL 300. The input signal IN_SIG received through the antenna 100 may be in a frequency band having a high center frequency by a carrier, and the RF circuit 200 may output a baseband signal B_SIG by shifting the input signal IN_SIG in the frequency band of the high center frequency based on the carrier signal C_SIG that corresponds to the carrier of the input signal IN_SIG. As it will be described with reference to FIG. 6, a frequency band of the baseband signal B_SIG may have an offset when a frequency of the carrier signal C_SIG received from the PLL 300 is not synchronized with a frequency of the carrier of the input signal IN_SIG.

The PLL 300 may generate the carrier signal C_SIG based on an oscillation signal OSC received from the oscillator 400 and may provide the carrier signal C_SIG to the RF circuit 200. For example, the PLL 300 may output the carrier signal C_SIG having N-folds (where N>0) frequency of a frequency of the oscillation signal OSC. Also, as shown in FIG. 1, the PLL 300 may receive a frequency control signal F_CTR from the frequency offset estimator 500 and may control a frequency of the carrier signal C_SIG according to the frequency control signal F_CTR.

The frequency offset estimator 500 may generate the frequency control signal F_CTR by estimating a carrier wave frequency offset and an offset of the carrier signal C_SIG. That is, to synchronize a frequency of the carrier signal C_SIG and a carrier frequency of the input signal IN_SIG, the frequency offset estimator 500 may receive a digital signal D_SIG that the analog-digital converter 600 outputs by converting the baseband signal B_SIG and may estimate a carrier frequency offset. The user equipment 10 may further include a digital mixer that receives the digital signal D_SIG output from the analog-digital converter 600, and the frequency offset estimator 500 may compensate a carrier frequency offset by controlling the digital mixer.

The analog-digital converter 600 may output the digital signal D_SIG by converting the baseband signal B_SIG that is generated from the RF circuit 200. As shown in FIG. 1, the analog-digital converter 600 may receive a sampling clock S_CLK, and the digital signal D_SIG output from the analog-digital converter 600 may be synchronized to the sampling clock S_CLK. For example, the analog-digital converter 600 may generate the digital signal D_SIG by sampling the baseband signal B_SIG at a positive edge of the sampling clock S_CLK.

As shown in FIG. 1, the sampling clock S_CLK may be generated from the oscillation signal OSC that is output from the oscillator 400. For example, the sampling clock S_CLK may have a frequency that is the same as a frequency of the oscillation signal OSC of the oscillator 400 or different from the frequency of the oscillation signal OSC by multiplying or dividing the oscillation signal OSC. As described with reference to FIG. 6, when the frequency of the sampling clock S_CLK has an offset, that is, when the frequency of the sampling clock S_CLK is not synchronized with a predefined frequency (i.e., a target sampling frequency) for sampling the baseband signal B_SIG, the digital signal D_SIG may be delayed or advanced. The frequency offset of the sampling clock S_CLK may be referred to as a sampling frequency offset. As a result, due to the sampling frequency offset, the digital signal D_SIG may have a time offset, and thus the time offset may be referred to as a sampling time offset.

The oscillator 400 may output the oscillation signal OSC having a constant frequency. According to an example embodiment, the oscillator 400 may include low-cost hardware. For example, the oscillator 400 may be a crystal oscillator or a temperature compensated crystal oscillator (TCXO) that outputs the oscillation signal OSC of a fixed frequency.

When a structure for controlling a frequency of the oscillation signal OSC or, for example, a digital-analog converter (DAC) or a voltage controlled TCXO (VC-TCXO) is used to compensate an offset of the frequency of the sampling clock S_CLK (i.e., a sampling frequency offset), a high cost and a high electrical power consumption may result. Also, to compensate the sampling frequency offset, when the user equipment 10 further includes an additional PLL that generates the sampling clock S_CLK having a frequency that may be controlled by the oscillation signal OSC output from the oscillator 400 and/or a re-sampler that receives the digital signal D_SIG output from the analog-digital converter 600, a high electrical power consumption, a high cost, and a waste of space may occur due to these additional structures. On the other hand, as it will be described below by referring to the drawings, a sampling frequency offset or a sampling time offset that is derived from a sampling frequency offset may be compensated despite the oscillator 400 having a low cost by using a time offset compensator 700 and a time offset estimator 800 according to an example embodiment. In this regard, the user equipment 10 may be low-cost and small in size, and electrical power consumption of the user equipment 10 may also decrease.

The time offset compensator 700 may receive the digital D_SIG from the analog-digital converter 600, may receive a time control signal T_CTR from the time offset estimator 800, and may output a time compensated signal TC_SIG. The time compensated signal TC_SIG output from the time offset compensator 700 may be processed by being transmitted to a demodulator or a decoder. The time offset compensator 700 may generate a time compensated signal TC_SIG which compensates for a time offset between the digital signal D_SIG and the time control signal T_CTR. For example, the time offset compensator 700 may generate a time compensated signal TC_SIG (expressed in a time offset in time offset compensation units) in response to the activated time control signal T_CTR. The time offset compensation unit may refer to a predefined length of time for compensating at once for a time offset and may be defined by a wireless communication system. For example, as it will be described with reference to FIG. 4, the time offset compensation unit in a global system for mobile communication (GSM) may be a ¼ symbol.

The time offset estimator 800 may receive the time compensated signal TC_SIG output from the time offset compensator 700 and may output the time control signal T_CTR. The time offset estimator 800 may compensate the sampling time offset caused by the sampling clock S_CLK as well as the channel time offset caused by the DL channel 2. For example, as it will be described with reference to FIG. 3, the time offset estimator 800 may compensate the sampling time offset and the channel time offset in parallel.

Figure 2:
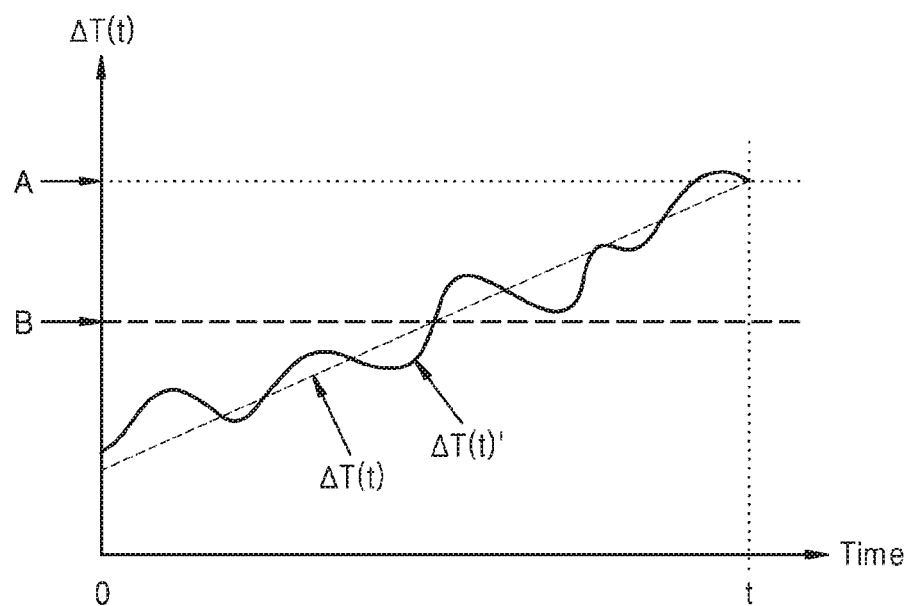
FIG. 2 is a graph that illustrates a time offset occurring in the user equipment shown in FIG. 1, according to an example embodiment.

FIG. 2 is a graph that illustrates a time offset occurring in the user equipment 10 shown in FIG. 1, according to an example embodiment. As described with reference to FIG. 1, the time offset estimator 800 of the user equipment 10 may generate the time control signal T_CTR by estimating the sampling time offset as well as the channel time offset, and the time offset compensator 700 may compensate the time offset in response to the time control signal T_CTR.

When the time offset, particularly, the channel time offset is estimated, a noise or a variance may occur on the estimated time offset, and accordingly a time offset accumulated for a certain period of time or a filtered time offset may be used. When a frequency offset of the sampling clock S_CLK (for example, due to a high-cost digital-analog converter and a VC-TCXO) is not large, the sampling time offset may decrease, and thus a period for accumulating or filtering the time offset may be secured. In some embodiments, when a frequency offset of the sampling clock S_CLK shown in FIG. 1 is relatively big (for example, due to a low-cost TCXO), the sampling time offset may increase, and thus accumulating or filtering the time offset may not be secured. Also, reliability of the finally estimated time offset may decrease due to a decreased accumulation period of the time offset. The time offset ΔT(t) at a time t may be defined in Equation 1.

$$\Delta T(t) = \Delta T(t-p) + p \cdot \alpha \cdot \Delta F_S + (\Delta T_C(t) - \Delta T_C(t-p))$$  Equation 1

In Equation 1, $\Delta F_S$ denotes a frequency offset that is, a sampling frequency offset, of the sampling clock S_CLK, and $\Delta T_C(t)$ denotes a channel time offset at the time t. Referring to Equation 1, the time offset ΔT(t) may include a channel time offset (i.e., $\Delta T_C(t) - \Delta T_C(t-p)$) and a sampling time offset (i.e., $p \cdot \alpha \cdot \Delta F_S$) that each occurred during a period p, where α is a proportional factor.

Referring to FIG. 2, a value A of the time offset ΔT(t) at a time (t), may be different from a value B that is calculated by accumulating the estimated time offset ΔT(t) (for example, B is an average of the accumulated values). When an accumulation period of the estimated time offset ΔT(t) is reduced to resolve inaccuracy of the estimation, a reliability of the estimation may decrease due to an increased variation of the calculated value. That is, in addition to compensating the channel time offset $\Delta T_C(t)$, compensation of the sampling time offset $\alpha \cdot \Delta F_S$ may be needed.

Figure 3:
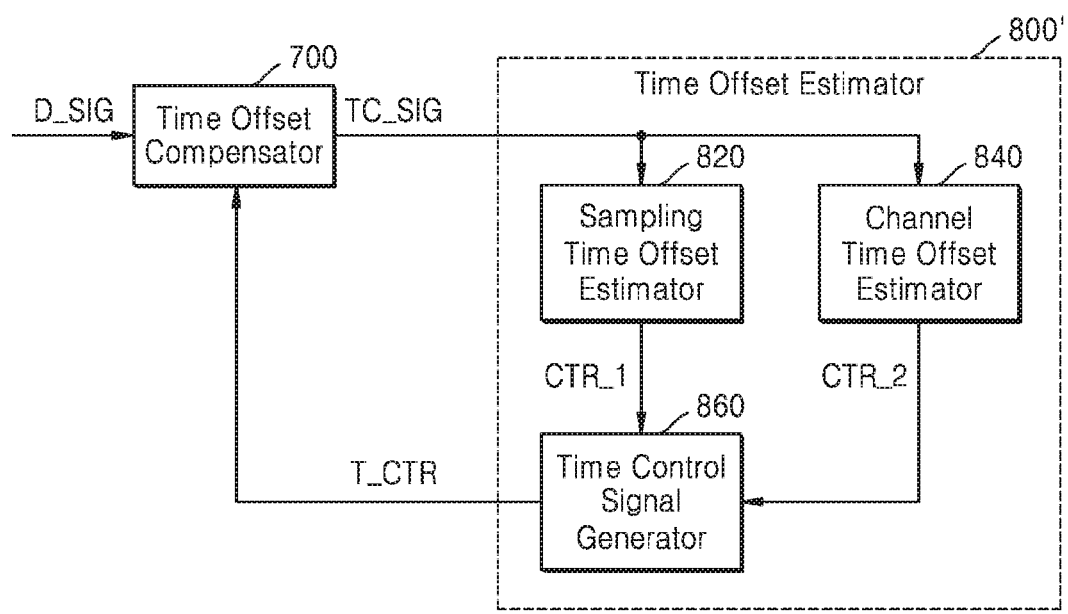
FIG. 3 is an example block diagram of a time offset estimator shown in FIG. 1, according to an example embodiment.

FIG. 3 is an example block diagram of the time offset estimator 800 shown in FIG. 1 according to an example embodiment. As described with reference to FIG. 1, a time offset estimator 800' shown in FIG. 3 may receive a time compensated signal TC_SIG from the time offset compensator 700 and may provide the time control signal T_CTR to the time offset compensator 700. As shown in FIG. 3, the time offset estimator 800' may include a sampling time offset estimator 820, a channel time offset estimator 840, and a time control signal generator 860.

According to an example embodiment, the time offset estimator 800' may estimate the sampling time offset and the channel time offset in parallel. That is, as shown in FIG. 3, the sampling time offset estimator 820 and the channel time offset estimator 840 may independently generate a first control signal CTR_1 and a second control signal CTR_2, and the time control signal generator 860 may generate a time control signal T_CTR based on the first and second control signals CTR_1 and CTR_2. For example, the time offset compensator 700 may compensate a time offset in a time offset compensation unit in response to the time control signal T_CTR being activated, and the time control signal generator 860 may activate the time control signal T_CTR when the first control signal CTR_1 or the second control signal CTR_2 is activated.

Referring to FIG. 3, the sampling time offset estimator 820 may receive a time compensated signal TC_SIG and may generate the first control signal CTR_1 by estimating the sampling time offset, that is, a time offset generated by a frequency offset of the sampling clock S_CLK shown in FIG. 1. For example, the sampling time offset estimator 820 may estimate a frequency offset of the sampling clock S_CLK, that is, a sampling frequency offset, and may estimate a sampling time offset based on the estimated sampling frequency offset. At a point of time for the estimated sampling time offset to be compensated in a time offset compensation unit, the sampling time offset estimator 820 may activate the first control signal CTR_1. The detailed description of the sampling time offset estimator 820 will be described with reference to FIGS. 5 and 8.

The channel time offset estimator 840 may receive a time compensated signal TC_SIG and may generate a second control signal CTR_2 by estimating a channel time offset, that is, a time offset that is generated by the DL channel 2 in FIG. 1. For example, as it will be described with reference to FIG. 4, the channel time offset estimator 840 may detect synchronization bits having predetermined bit sequences and may estimate the channel time offset based on the synchronization bits. At a point of time for the estimated channel time offset to be compensated in a time offset compensation unit, the channel time offset estimator 840 may generate the activated second control signal CTR_2. As it will be described with reference to FIG. 8, according to an example embodiment, the channel time offset estimated in the channel time offset estimator 840 may be used when the sampling time offset estimator 820 estimates the sampling time offset.

Figure 4:
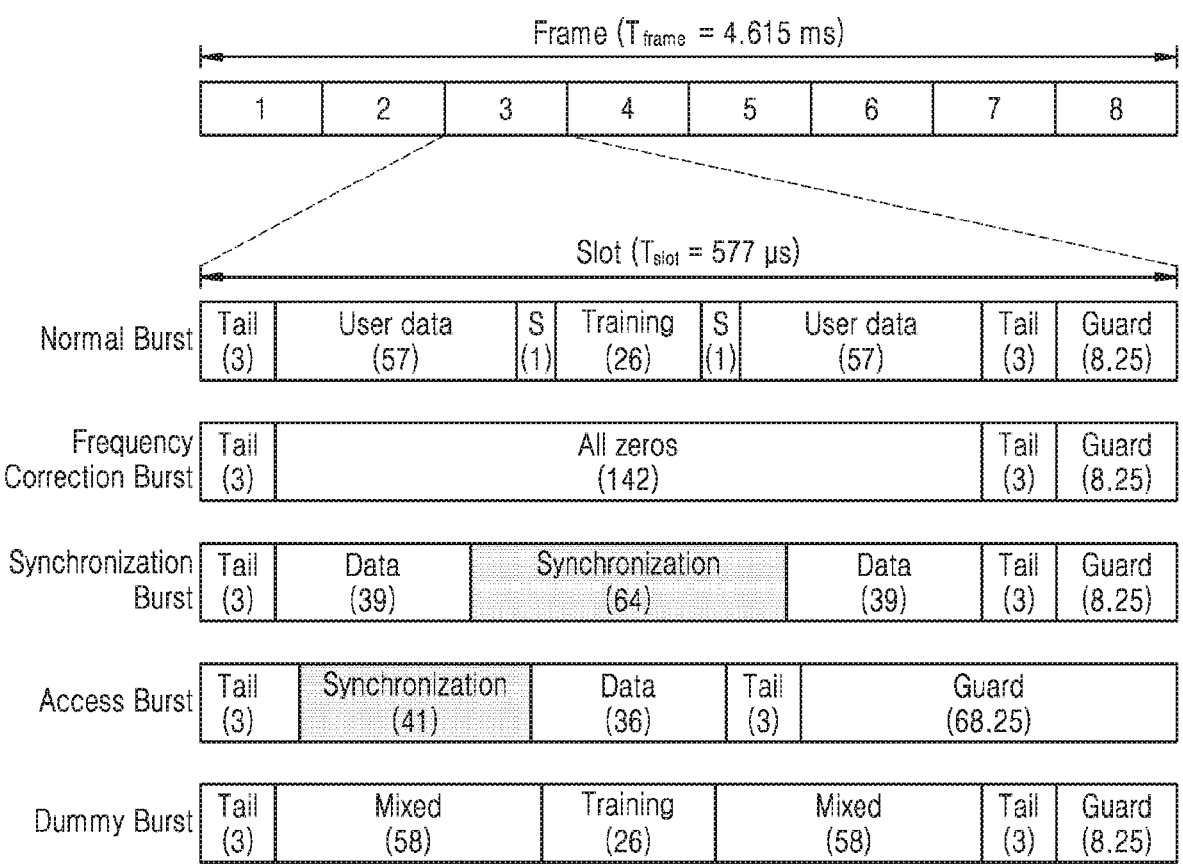
FIG. 4 is an example time-domain structure in the wireless system of FIG. 1, according to an example embodiment.

FIG. 4 is an example time-domain structure in the wireless system of FIG. 1, according to an example embodiment. In particular, FIG. 4 illustrates a time-domain structure of a global system for mobile (GSM) communication. Hereinafter, example embodiments will be described with reference to the GSM, but it will be understood that the example embodiments may be applied to communication standards, for example, long-term evolution (LTE), high speed packet access (HSPA), and universal mobile telecommunication system (UMTS) which are different from the GSM.

Referring to FIG. 4, a frame, as a transmitting unit of a signal from the GSM, may have a length of about 4.615 ms and may include eight slots. Each of the slots may have a length of about 577 us and may have various burst modes. As shown in FIG. 4, a synchronization burst and a normal burst may have particular bit sequences, and the bits may have predetermined bit sequences for time synchronization. As described above with reference to FIG. 3, the channel time offset estimator 840 shown in FIG. 3 may estimate a channel time offset by detecting the synchronization bits.

In the GSM, the base station 20 shown in FIG. 1 may allot one of the eight slots that constitute one frame to the user equipment 10. In this regard, the user equipment 10 may secure time for compensating a time offset during times that correspond to slots that are not allotted to the user equipment 10. That is, the user equipment 10 may have a time needed for compensating a time offset in every frame. Thus, according to an example embodiment, time synchronization may be maintained with using high-cost hardware (e.g., a digital-analog converter for fine frequency control and a voltage control temperature compensated crystal oscillator), and performance of the wireless communication system may also be maintained.

A time offset in the GSM may be compensated in a ¼ symbol (i.e., a time corresponding to ¼ bit) unit. That is, the time offset compensator 700 shown in FIG. 3 may compensate the time offset by ¼ symbol in response to the time control signal T_CTR that is received from the time offset estimator 800.

Figure 5:
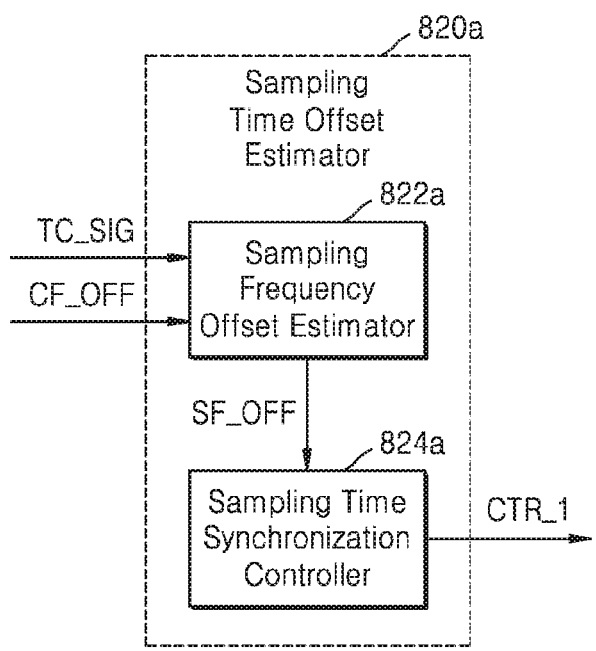
FIG. 5 is an example block diagram of a sampling time offset estimator shown in FIG. 3, according to an example embodiment.

FIG. 5 is an example block diagram of the sampling time offset estimator 820 shown in FIG. 3, according to an example embodiment. As described above with reference to FIG. 3, a sampling time offset estimator 820a in FIG. 5 may generate a first control signal CTR_1 by estimating a time offset caused by an offset of a time sampling frequency (e.g., a frequency of the sampling clock S_CLK in FIG. 1). As shown in FIG. 5, the sampling time offset estimator 820a may include a sampling frequency offset estimator 822a and a sampling time synchronization controller 824a.

The sampling frequency offset estimator 822a may estimate a sampling frequency offset based on a carrier frequency offset and may generate a sampling frequency offset signal SF_OFF including information about the estimated sampling frequency offset. For example, as shown in FIG. 5, the sampling frequency offset estimator 822a may receive a carrier frequency offset signal CF_OFF (for example, from the frequency offset estimator 500 in FIG. 1) and may obtain a carrier frequency offset (i.e., the frequency offset of the carrier signal C_SIG in FIG. 1) from the carrier frequency offset signal CF_OFF. As described with reference to FIG. 1, the carrier signal C_SIG and the sampling clock S_CLK are generated from the oscillation signal OSC output from the oscillator 400, and thus a frequency offset of the carrier signal C_SIG and a frequency offset of the sampling clock S_CLK may be generated from a frequency offset of the oscillation signal OSC. Thus, the carrier frequency offset (for example, estimated by the frequency offset estimator 500 in FIG. 1) and the sampling frequency offset may have correlation, and the sampling frequency offset estimator 822a may use the correlation to estimate the sampling frequency offset. The detailed description of the sampling frequency offset estimator 822a will be provided with reference to FIG. 6.

The sampling time synchronization controller 824a may receive the sampling frequency offset signal SF_OFF from the sampling frequency offset estimator 822a and may generate a first control signal CTR_1 based on the sampling frequency offset obtained from the sampling frequency offset signal SF_OFF. As described with reference to Equation 1, the sampling time offset is proportional to the sampling frequency offset, and thus the sampling time synchronization controller 824a may calculate a sampling time offset from the sampling frequency offset and may determine an activation point of the first control signal CTR_1 based on the calculated sampling time offset. The detailed description of the sampling time synchronization controller 824a will be described with reference to FIGS. 7A and 7B.

Figure 6:
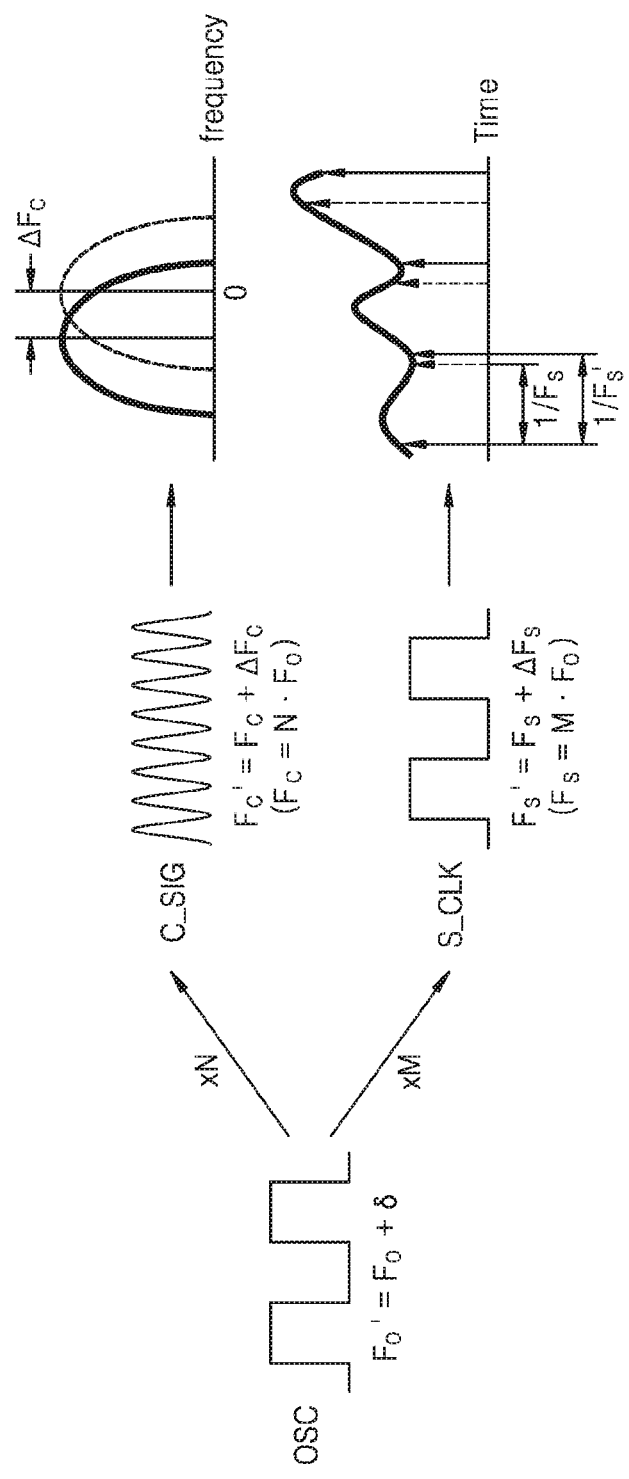
FIG. 6 is a view for illustrating an operation of a sampling frequency offset estimator shown in FIG. 5, according to an example embodiment.

FIG. 6 is a view for illustrating an operation of the sampling time offset estimator 820a in FIG. 5, according to an embodiment. As described above with reference to FIG. 5, the sampling time offset estimator 820a may estimate a sampling frequency offset based on a carrier frequency offset. Hereinafter, FIG. 6 will be described with reference to FIGS. 1 and 5.

Referring to FIG. 6, a frequency $F_O'$ of an oscillation signal OSC output from the oscillator 400 may be the sum of a target frequency $F_O$ and a frequency offset δ. The frequency offset δ may be derived from characteristics of the oscillator 400 and may be different in a plurality of user equipments including the user equipment 10.

A carrier signal C_SIG may be generated by multiplying N (an integer greater than 0) to the oscillation signal OSC, and thus the carrier frequency offset $\Delta F_C$ may be N times the frequency offset δ of the oscillation signal OSC ($\Delta F_C = N \cdot \delta$) in the frequency $F_C'$ of the carrier signal C_SIG, which is the sum of the target frequency (i.e., a target carrier frequency) $F_C$ and the carrier frequency offset $\Delta F_C$ of the carrier signal C_SIG. From the carrier frequency offset $\Delta F_C$, as shown in FIG. 6, a frequency band of the baseband signal B_SIG moved to a baseband by the RF circuit 200 may be shifted about $\Delta F_C$.

Similarly, the sampling clock S_CLK may be generated by multiplying the oscillation signal OSC M-fold (M is an integer greater than 0), and thus sampling frequency offset $\Delta F_S$ may be M times the frequency offset δ of the oscillation signal OSC ($\Delta F_S = M \cdot \delta$) in the frequency $F_S'$ of the sampling clock S_CLK, which is the sum of the target frequency (i.e., a target sampling frequency) $F_S$ and the sampling frequency offset $\Delta F_S$ of the sampling clock S_CLK. Due to the sampling frequency offset $\Delta F_S$, as shown in FIG. 6, a recovered digital signal D_SIG that is generated as the analog-digital converter 600 samples the baseband signal B_SIG in a $1/F_S'$ period may be different from the baseband signal B_SIG.

As described above, the carrier frequency offset $\Delta F_C$ and sampling frequency offset $\Delta F_S$ may be determined from the frequency offset δ of the oscillation signal OSC, and thus carrier frequency offset $\Delta F_C$ and the sampling frequency offset $\Delta F_S$ may have a relationship defined in Equation 2 as follows.

$$\delta = \frac{\Delta F_C}{N} = \frac{\Delta F_S}{M} \quad \text{Equation 2}$$

Also, in Equation 2, N is $F_C/F_O$, and M is $F_S/F_O$, and thus the carrier frequency offset $\Delta F_C$ and the sampling frequency offset $\Delta F_S$ may have a relationship defined in Equation 3 as follows.

$$\delta = \frac{\Delta F_C}{F_C} F_O = \frac{\Delta F_S}{F_S} F_O \quad \text{Equation 3}$$

That is, the sampling frequency offset $\Delta F_S$ may be estimated to match a ratio of the sampling frequency $F_S$ to the sampling frequency offset $\Delta F_S$ with a ratio of the target carrier frequency $F_C$ to the carrier frequency offset $\Delta F_C$. In this regard, the target carrier frequency $F_C$ and the target sampling frequency $F_S$ are predetermined, and the carrier frequency offset $\Delta F_C$ may be obtained from a carrier frequency offset signal CF_OFF, and thus the sampling frequency offset $\Delta F_S$ may be calculated according to Equation 4.

$$\Delta F_S = F_S \cdot \frac{\Delta F_C}{F_C} \quad \text{Equation 4}$$

The sampling frequency offset estimator 822a may estimate the sampling frequency offset $\Delta F_S$ in a constant period based on the carrier frequency offset $\Delta F_C$. For example, the sampling frequency offset estimator 822a may generate a sampling frequency offset signal SF_OFF by estimating the sampling frequency offset $\Delta F_S$ every frame. As it will be described, the sampling time synchronization controller 824a may generate a first control signal CTR_A based on the sampling frequency offset signal SF_OFF that is periodically generated. Hereinafter, the sampling frequency offset estimator 822a will be described as generating the sampling frequency offset signal SF_OFF by estimating the sampling frequency offset $\Delta F_S$ every frame, but it will be understood that embodiments of the inventive concept are not limited thereto.

Figure 7A:
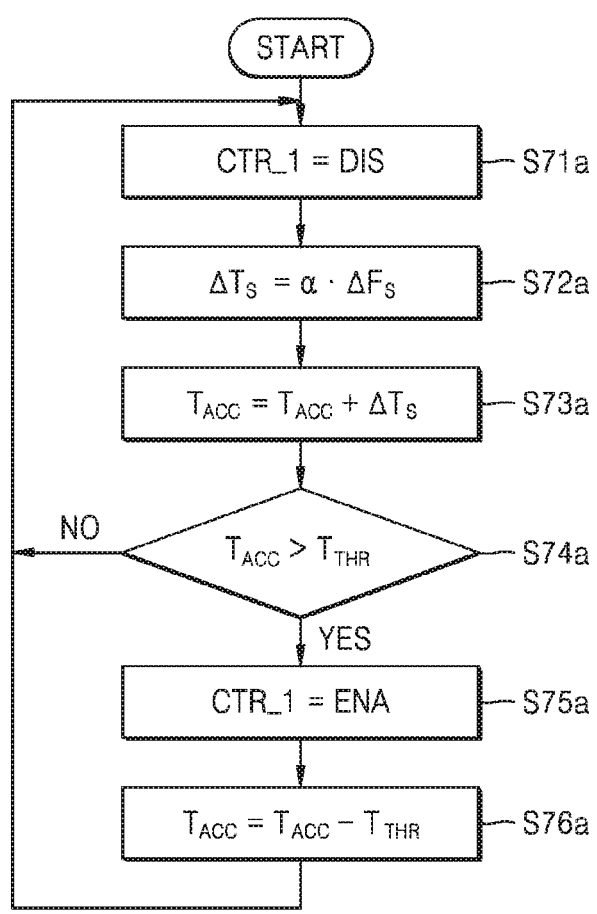
FIGS. 7A and 7B are flowcharts that illustrate example operations of a sampling time synchronization controller shown in FIG. 5, according to example embodiments.
Figure 7B:
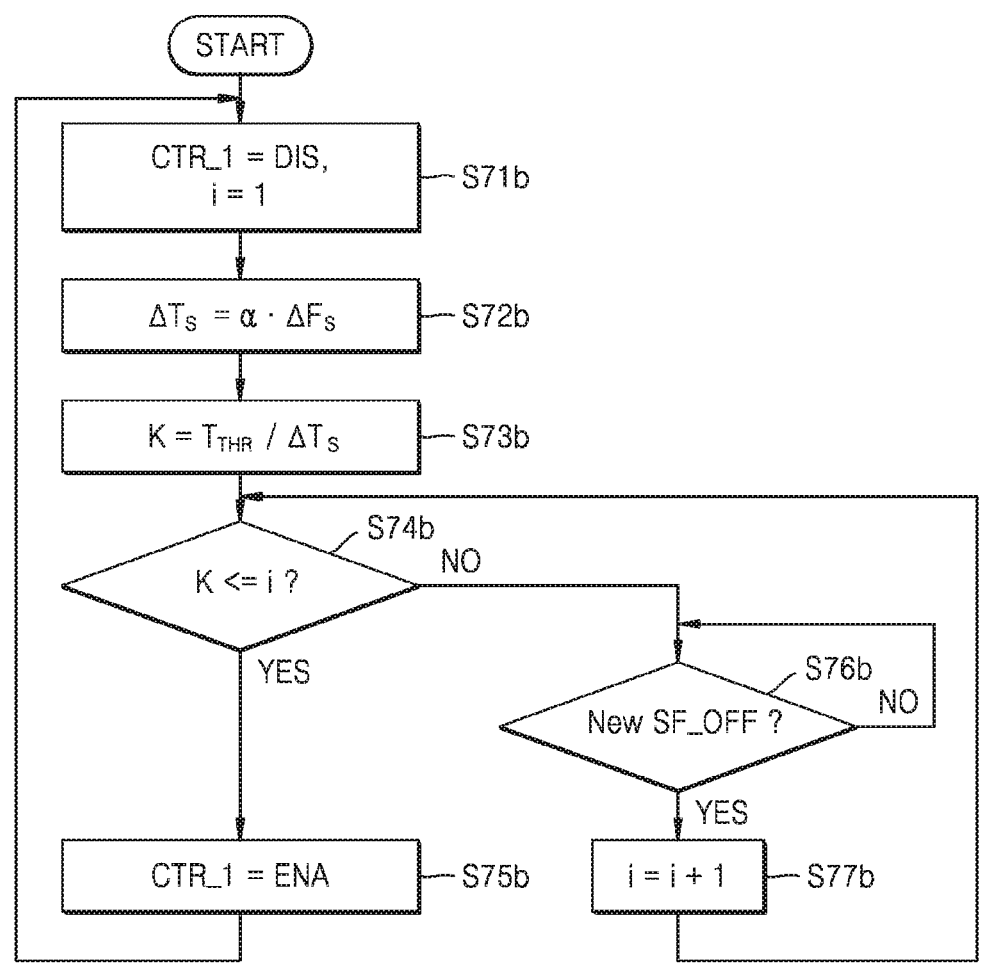

FIGS. 7A and 7B are flowcharts that illustrate example operations of the sampling time synchronization controller 824a shown in FIG. 5 according to example embodiments. As described above with reference to FIG. 5, the sampling time synchronization controller 824a may generate the first control signal CTR_1 based on a sampling frequency offset obtained from the sampling frequency offset signal SF_OFF.

According to an example embodiment, the sampling time synchronization controller 824a may accumulate a sampling time offset that occurs for a certain period of time, and when the accumulated sampling time offset exceeds a time offset compensation unit, the first control signal CTR_1 may be activated. Also, according to an example embodiment, the sampling time synchronization controller 824a may calculate a point of time when the first control signal CTR_1 is activated based on the sampling time offset that occurred for a certain period of time and the time offset compensation unit, and the first control signal CTR_A may be activated at the calculated point of time. Hereinafter, examples of an operation of the sampling time synchronization controller 824a will be described with reference to FIGS. 7A and 7B, and repeated description of FIGS. 7A and 7B will be omitted.

Referring to FIG. 7A, in operation S71a, the sampling time synchronization controller 824a may inactivate the first control signal CTR_1, and, in operation S72a, the sampling time synchronization controller 824a may calculate a sampling time offset $\Delta T_S$ from the sampling frequency offset $\Delta F_S$. That is, the sampling time offset $\Delta T_S$ may denote a time offset occurred by the sampling frequency offset $\Delta F_S$ in one frame. A proportional factor $\alpha$ may be determined based on a period (e.g., a length of a frame) in which the sampling frequency offset estimator 822a generates the sampling frequency offset signal SF_OFF.

In operation S73a, the sampling time synchronization controller 824a may accumulate the sampling time offset $\Delta T_S$ calculated in operation S72a. That is, as shown in FIG. 7A, the sampling time synchronization controller 824a may calculate the sampling time offset $T_{ACC}$ that is accumulated by accumulating the sampling time offset $\Delta T_S$.

In operation S74a, the sampling time synchronization controller 824a may compare the accumulated sampling time offset $T_{ACC}$ and a base period $T_{THR}$. The base period $T_{THR}$ may be a length of time (e.g., a length of a ¼ symbol in GSM) during which a time offset may be compensated at once by the time offset compensator 700. When the accumulated sampling time offset $T_{ACC}$ is not greater than the base period $T_{THR}$, the sampling time synchronization controller 824a may perform operations S71a to S73a again based on a sampling frequency offset signal SF_OFF that is newly transmitted from the sampling frequency offset estimator 822a. On the other hand, when the accumulated sampling time offset $T_{ACC}$ exceeds the base period $T_{THR}$, the sampling time synchronization controller 824a may proceed to operation S75a.

In operation S75a, the sampling time synchronization controller 824a may activate the first control signal CTR_1. That is, since the accumulated sampling time offset $T_{ACC}$ exceeds the time offset compensation unit, the sampling time synchronization controller 824a may activate the first control signal CTR_1.

In operation S76a, the sampling time synchronization controller 824a may update the accumulated sampling time offset $T_{ACC}$. That is, as shown in FIG. 7A, since the time offset is compensated about the time offset unit (by the time offset compensator 700) due to the first control signal CTR_1 activated in operation S76a, the sampling time synchronization controller 824a may update the accumulated sampling time offset $T_{ACC}$ by subtracting the base period $T_{THR}$ from the accumulated sampling time offset $T_{ACC}$. Thereafter, the sampling time synchronization controller 824a may perform operations starting with operation S71a again.

Referring to FIG. 7B, in operation S71b, the sampling time synchronization controller 824a may inactivate the first control signal CTR_1 and may set a variable i as 1. The variable i may denote an index of a frame and may increase by 1 when a new sampling frequency offset signal SF_OFF (corresponding to a new frame) is received. In operation S72b, the sampling time synchronization controller 824a may calculate the sampling time offset $\Delta T_S$ from the sampling frequency offset $\Delta F_S$.

In operation S73b, the sampling time synchronization controller 824a may calculate a point of time when the first control signal CTR_1 is activated. That is, as shown in FIG. 7B, a variable K may be calculated by dividing the base period $T_{THR}$ with the sampling time offset $\Delta T_S$. Accordingly, the number of sampling frequency offset signals SF_OFFs that would be received until the activated first control signal CTR_1 is generated may be derived from the variable K.

In S74b, the sampling time synchronization controller 824a may compare the variable K with the variable i, and when the variable i is greater or the same with the variable K, in operation S75b, the sampling time synchronization controller 824a may output the activated first control signal CTR_1. On the other hand, when the variable i is smaller than the variable K, in operation S76b, the sampling time synchronization controller 824b may determine whether a new sampling frequency offset signal SF_OFF is received. That is, since the sampling frequency offset estimator 822a generates a sampling frequency offset signal SF_OFF every frame, in operation S76b, the sampling time synchronization controller 824a may check whether a time that corresponds to a frame length is lapsed. When a new frequency offset signal SF_OFF is received, in operation S77b, the sampling time synchronization controller 824a may increase the variable i about 1, and, in the next operation, S76b, operation of comparing the variable K and the variable i may be performed again. When the sampling time synchronization controller 824a is a hardware block designed by logic synthesis, the sampling time synchronization controller 824a, according to an embodiment shown in FIG. 7A, may include an accumulator for the accumulated sampling time offset $T_{ACC}$. Also, the sampling time synchronization controller 824a, according to an embodiment shown in FIG. 7B, may include a counter for the variable i.

Figure 8:
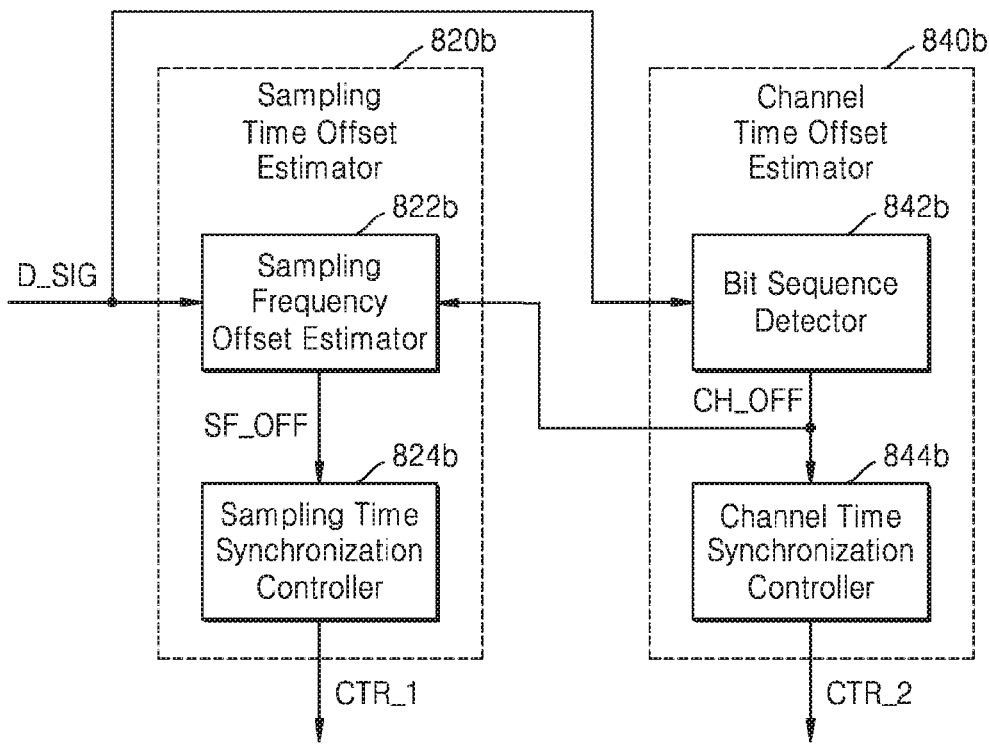
FIG. 8 is an example block diagram of the sampling time offset estimator and a channel time offset estimator shown in FIG. 3, according to an example embodiment.

FIG. 8 is an example block diagram of the sampling time offset estimator 820 and the channel time offset estimator 840 shown in FIG. 3, according to an example embodiment. In the description of FIG. 8, description overlapping with that of FIG. 5 will be omitted.

Referring to FIG. 8, the sampling time offset estimator 820b may include a sampling frequency offset estimator 822b and a sampling time synchronization controller 824b. According to an example embodiment, the sampling time offset estimator 820b may estimate a sampling frequency offset based on a change in a channel time offset. As described above with reference to FIG. 2, when an offset exists in a sampling frequency, a size of the estimated time offset may increase in time, and thus a sampling time offset may be estimated based on a size change in the estimated time offset per unit time. In this regard, the sampling frequency offset estimator 822b may receive a channel time offset signal CH_OFF from a bit sequence detector 842b, and a sampling frequency offset may be estimated by calculating a change in the channel time offset from the channel time offset signal CH_OFF. That is, the channel time offset estimated by the bit sequence detector 842b includes a sampling time offset by the sampling frequency offset, and thus a sampling frequency offset may be estimated by calculating a change in the channel time offset. The channel time offset $\Delta T_C(t)$ and the sampling frequency offset $\Delta F_S$ at a time t may have a relationship defined in Equation 5 as follows.

$$\frac{d}{dt}\Delta T_C(t) = \alpha \cdot \Delta F_S \qquad \text{Equation 5}$$

The sampling frequency offset estimator 822b may include a secondary infinite impulse response (IIR) filter to calculate a change in the channel time offset, and a change in the channel time offset A(i) may be calculated as defined in Equation 6 as follows.

$$A(i) = \beta \cdot A(i-1) + (1-\beta)\{\beta T_C(i-1)\} \qquad \text{Equation 6}$$

In Equation 6, i may denote an index of a frame, and β may have a value between 0 and 1. Similar to Equation 2, a frequency offset of the oscillation OSC δ may be calculated as defined in Equation 7 by using the change in the channel time offset A(i), and, accordingly, the sampling frequency offset $\Delta F_S$ may be calculated as defined in Equation 8. That is, the sampling frequency offset $\Delta F_S$ may be estimated such that a ratio of the target sampling frequency $F_S$ to the sampling frequency offset $\Delta F_S$ matches a ratio of a frame length to the change in the channel time offset A(i).

$$\delta = \frac{A(i)}{T_{frame}} = \frac{\Delta F_S}{F_S} \qquad \text{Equation 7}$$

$$\Delta F_S = F_S \cdot \frac{A(i)}{T_{frame}} \qquad \text{Equation 8}$$

According to an example embodiment, the sampling frequency offset estimator 822b may estimate a sampling frequency offset based on a change in the total time offset including the channel time offset and the sampling time offset. That is, the total time offset including the sampling time offset calculated by using the channel time obtained from the channel time offset signal CH_OFF and the sampling frequency offset estimated before, and a new sampling frequency offset may be calculated by using a change in the total time offset. For example, in Equation 5 and Equation 6, the channel time offset $\Delta T_C$ may be replaced with the total time offset $\Delta T$ including the sampling time offset.

The sampling time synchronization controller 824b may operate identical or similar to the sampling time synchronization controller 824a shown in FIG. 5. For example, as described above with reference to FIGS. 7A and 7B, the sampling time synchronization controller 824b may accumulate the sampling frequency offset based on the sampling frequency offset obtained from the sampling frequency offset signal SF_OFF or generate the first control signal CTR_1 by calculating an activation point of time.

Referring to FIG. 8, the channel time offset estimator 840b may include a bit sequence detector 842b and a channel time synchronization controller 844b. The bit sequence detector 842b may detect a bit sequence that corresponds to synchronization bits from a digital signal D_SIG to estimate a channel time offset. As described above with reference to FIG. 4, the synchronization bits included in a slot may include a pre-determined bit sequence, and the bit sequence detector 842b may generate a channel time offset signal CH_OFF including information about the channel time offset by detecting the bit sequence.

The channel time synchronization controller 844b may obtain a channel time offset from the channel time offset signal CH_OFF received from the bit sequence detector 842b and may generate a second control signal CTR_2 based on the obtained channel time offset. For example, the bit sequence detector 842b may accumulate or filter the channel time offsets obtained for a certain period of time to remove noise and/or deviation, and the second control signal CTR_2 may be activated or inactivated according to the result. As will be described with reference to FIG. 9, the sampling time offset may be estimated every frame by the sampling time offset estimator 820b, and, accordingly, the first control signal CTR_1 may be activated or inactivated every first period (e.g. every frame). The channel time offset estimator 840b may activate or inactivate the second control signal CTR_2 every second period (e.g. every period that is longer than a frame). The first period may be shorter than the second period.

Figure 9:
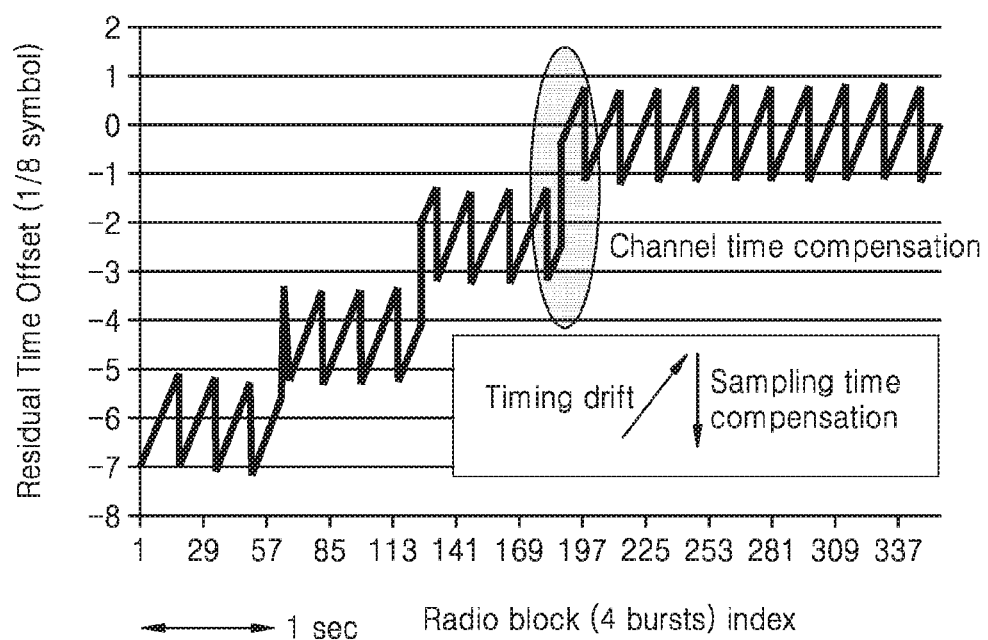
FIG. 9 is a graph that illustrates the test results of compensating a time offset, according to an example embodiment.

FIG. 9 is a graph that illustrates the results of a test in which a time offset is compensated, according to an example embodiment. In FIG. 9, a horizontal axis indicates an index of a GSM radio block (4 frames), and a vertical axis represents a time offset in a ⅛ symbol unit. In the graph of FIG. 9, compensation according to the estimation of the channel time offset occurs every 1 second, and an initial time offset is set as a −⅞ symbol. Also, the frequency offset of the oscillation signal OSC is set to 3 ppm, and a sampling frequency is assumed to be matched with a frequency of the oscillation signal OSC. Accordingly, the time offset compensation unit in the GSM is a ¼ symbol, and thus the sampling time offset caused by the offset of the sampling frequency in FIG. 9 may occur ¼ symbol per about 64 frame. As shown in FIG. 9, the sampling time compensation may be performed by ¼ symbol per about 64 frame (i.e., about 16 radio block), and the channel time compensation may be performed by ¼ symbol per about 1 second. That is, due to the compensation of the sampling offset time according to an example embodiment, a time for accumulating or filtering the channel time offsets for the channel time compensation may be sufficiently secured, and as a result, the time offset may be accurately compensated.

Figure 10:
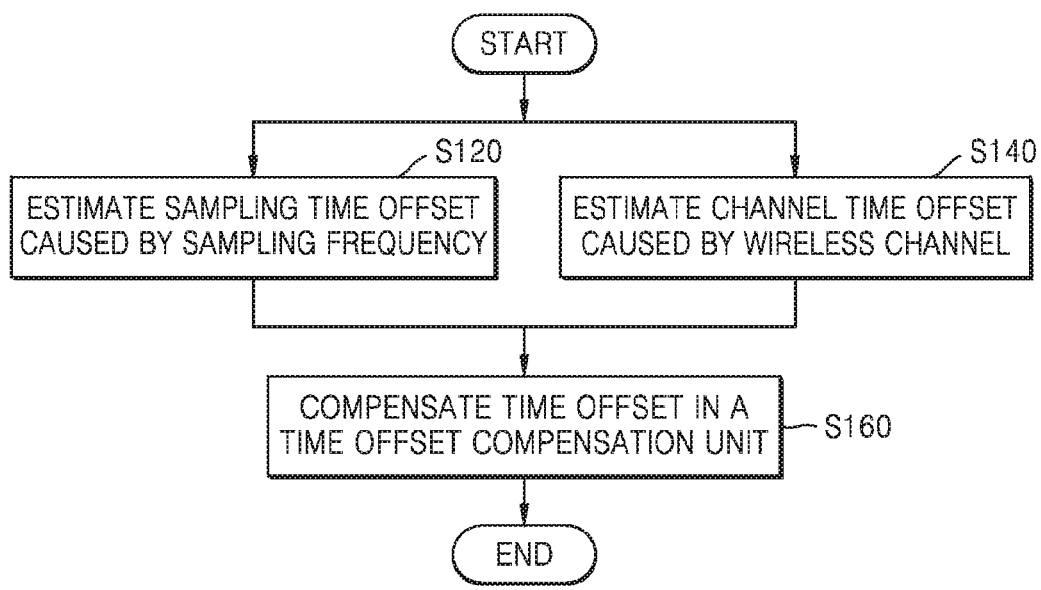
FIG. 10 is a flowchart that illustrates a method for time synchronization in a wireless communication system, according to an example embodiment.

FIG. 10 is a flowchart that illustrates a method for time synchronization in a wireless communication system, according to an example embodiment. For example, the method for time synchronization in a wireless communication system may be performed by using the time offset estimator 800 and the time offset compensator 700 included in the user equipment 10 of FIG. 1. As shown in FIG. 1, the method for time synchronization in a wireless communication system may include a plurality of operations S120, S140, and S160.

Referring to FIG. 10, in operation S120, an operation of estimating a sampling time offset caused by a sampling frequency may be performed. As described above with reference to FIG. 2, since the sampling frequency offset may generate a time offset (i.e., a sampling time offset), the sampling frequency offset is estimated, and a sampling time offset may be estimated based on the estimated sampling frequency.

In operation S140, an operation of estimating a channel time offset caused by a wireless channel may be performed. As described above with reference to FIG. 4, a channel time offset caused by the wireless channel (e.g., the DL channel 2 in FIG. 1) may be estimated by detecting the synchronization including a pre-defined bit sequence. As shown in FIG. 10, operation S120 and operation S140 may be performed in parallel. That is, the operation of estimating the sampling time offset and the operation of estimating the channel time offset may be performed in parallel.

In operation S160, an operation of compensating a time offset in a time offset compensation unit may be performed. For example, when the sampling time offset accumulated by accumulating the estimated sampling time offset exceeds a time offset compensation unit, a time offset may be compensated about the time offset compensation unit. Also, when the channel time offset calculated by accumulating or filtering the channel time offsets for a certain period of time exceeds the time offset compensation unit, the time offset may be compensated about the time offset compensation unit.

Figure 11A:
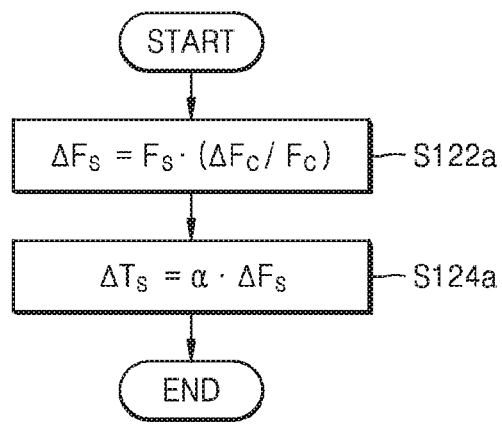
FIGS. 11A and 11B are flowcharts that illustrate examples of S120 shown in FIG. 10 according to example embodiments.
Figure 11B:
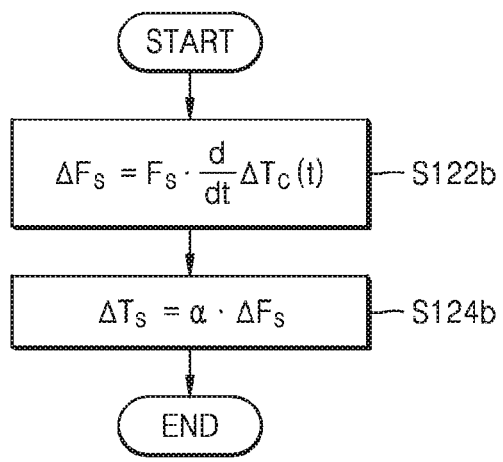

FIGS. 11A and 11B are flowcharts that illustrate examples of the operation S120 in FIG. 10, according to example embodiments. According to the example embodiments, the method for time synchronization in the wireless communication system may use a carrier frequency offset as shown in FIG. 11A or may use a change in the channel time offset as shown in FIG. 11B to estimate a sampling frequency offset.

Referring to FIG. 11A, in operation S122a, an operation of estimating the sampling frequency offset based on the carrier frequency offset may be performed. For example, as shown in FIG. 11A, the sampling frequency offset $\Delta F_S$ may be estimated such that a ratio of a target sampling frequency $F_S$ to an offset $\Delta F_S$ of the sampling frequency matches a ratio of a target carrier frequency $F_C$ to a carrier frequency offset $\Delta F_C$.

In operation S124a, a sampling time offset may be estimated based on the estimated sampling frequency offset. For example, as shown in FIG. 11A, the sampling time offset $\Delta T_S$ may be proportional to the sampling frequency offset $\Delta F_S$, and a proportional factor α may be determined based on a period (e.g., a frame) during which the sampling time offset $\Delta T_S$ occurred.

Referring to FIG. 11B, in operation S122b, an operation of estimating a sampling frequency offset based on the channel time offset may be performed. For example, as shown in FIG. 11B, the sampling frequency offset $\Delta F_S$ may be estimated such that a ratio of the target sampling frequency $F_S$ to the sampling frequency offset $\Delta F_S$ matches a ratio of a frame length to a change in the channel time offset $\Delta T_C(t)$, i.e., a changed ratio of the channel time offset $d/dt \Delta T_C(t)$.

In operation S124b, a sampling time offset may be estimated based on the estimated sampling frequency offset. For example, as shown in FIG. 11A, the sampling time offset $\Delta T_S$ may be proportional to a sampling frequency offset $\Delta F_S$, and a proportional factor α may be determined based on a period during which the sampling time offset $\Delta T_S$ occurred.

Figure 12:
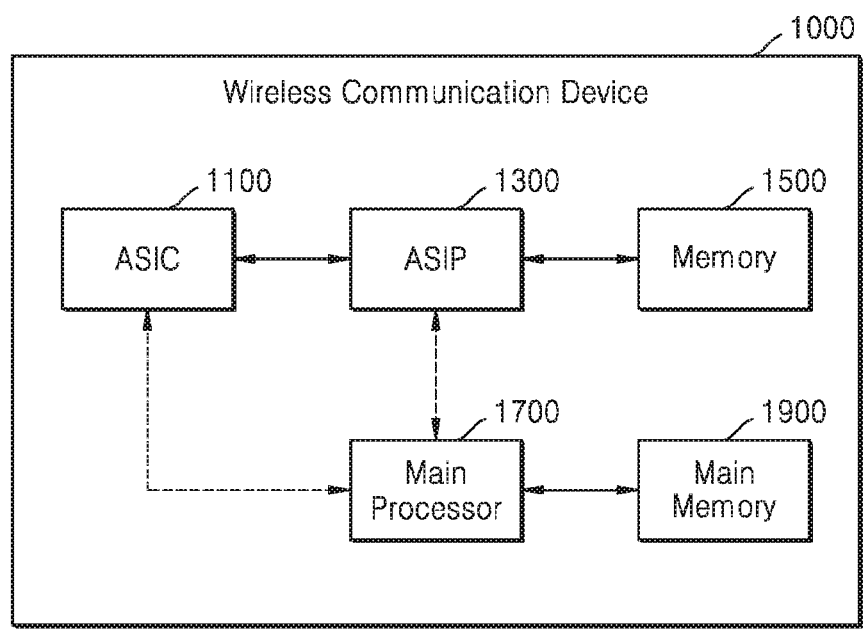
FIG. 12 is an example block diagram of a wireless communication apparatus according to an example embodiment.

FIG. 12 shows an example block diagram of a wireless communication device 1000, according to an example embodiment. As shown in FIG. 12, the wireless communication device 1000 may include an application specific integrated circuit (ASIC) 1100, an application specific instruction set processor (ASIP) 1300, a memory 1500, a main processor 1700, and a main memory 1900. Two or more selected from the ASIC 1100, the ASIP 1300, and the main processor 1700 may communicate each other. Also, at least two or more selected from the ASIC 1100, the ASIP 1300, the memory 1500, the main processor 1700, and the main memory 1900 may be included in one chip.

The ASIP 1300 is an integrated circuit that is customized by design for a particular use, which may support an instruction set for particular application and may perform a command included in the instruction set. The memory 1500 may communicate with the ASIP 1300 and may store a plurality of commands that are performed by the ASIP 1300, as a non-temporary storage apparatus. For example, non-limiting examples of the memory 1500 may include random access memory (RAM), read only memory (ROM), tape, magnetic disc, optical disc, volatile memory, non-volatile memory, and a combination thereof which are memories that may be randomly accessed by the ASIP 1300.

The main processor 1700 may control the wireless communication device 1000 by performing a plurality of commands. For example, the main processor 1700 may control the ASIC 1100 and ASIP 1300 or may process data received via a wireless communication network or an input of a user with respect to the wireless communication device 1000. The main memory 1900 may communicate with the main processor 1700 and may store a plurality of commands that are performed by the main processor 1700, as the non-temporary storage apparatus. For example, non-limiting examples of the main memory 1900 may include RAM, ROM, tape, magnetic disc, optical disc, volatile memory, non-volatile memory, and a combination thereof which are memories that may be randomly accessed by the main processor 1700.

As described above, according to one or more example embodiments, elements of an apparatus for time synchronization or operations that constitute a method for time synchronization may be included in elements included in the wireless communication device 1000 of FIG. 12. For example, the time offset estimator 800 in FIG. 1 or at least one operation among operations of the method for time synchronization shown in FIG. 10 may realize a plurality of commands stored in the memory 1500, and an operation or at least one operation of the time offset estimator 800 may be performed as the ASIP 1300 performs the plurality of commands stored in the memory 1500. In another example embodiment, the time offset estimator 800 in FIG. 1 or at least one operation among operations of the method for time synchronization of FIG. 10 may be realized in a hardware block that is designed by logic synthesis and may be included in the ASIC 1100. In another example embodiment, the time offset estimator 800 in FIG. 1 or at least one operation among operations of the method for time synchronization of FIG. 10 may be realized as a plurality of commands stored in the main memory 1900, and an operation of the time offset estimator 800 or at least one operation among operations of the method for time synchronization of FIG. 10 may be performed as the main processor 1700 performs the plurality of commands stored in the main memory 1900.

While the inventive concept has been particularly shown and described with reference to embodiments thereof, it will be understood that various changes in form and details may be made therein without departing from the spirit and scope of the following claims.

What is claimed is:

1. An apparatus for wireless communication, the apparatus comprising: a sampling time offset estimator comprising circuitry configured to estimate a sampling time offset caused by a sampling frequency used in sampling an input signal received through a wireless channel, and to generate a first control signal based on the sampling time offset that is estimated; a channel time offset estimator comprising circuitry configured to estimate a channel time offset caused by the wireless channel, and to generate a second control signal based on the channel time offset that is estimated; a time control signal generator comprising circuitry configured to generate a time control signal based on the first control signal or the second control signal; and a time offset compensator comprising circuitry configured to compensate for a time offset of the input signal, based on the time control signal, for time synchronization with a transmitter of the input signal, wherein the circuitry of the sampling time offset estimator is further configured to: estimate a sampling frequency offset of the sampling frequency, and generate a sampling frequency offset signal based on the sampling frequency offset for each of a first period; estimate the sampling time offset during the first period based on the sampling frequency offset signal, and generate the first control signal based on the sampling time offset that is estimated; and estimate the sampling frequency offset of the sampling frequency based on at least one of an offset of a carrier frequency for a frequency band shift of the input signal; and a first change in the channel time offset.

2. The apparatus of claim 1, wherein the circuitry of the sampling time offset estimator is further configured to estimate the sampling frequency offset of the sampling frequency such that a first ratio of a target sampling frequency to the sampling frequency offset matches a second ratio of a target carrier frequency to a carrier frequency offset of the carrier frequency.

3. The apparatus of claim 1, further comprising an oscillator configured to output an oscillation signal, wherein each of the sampling frequency and the carrier frequency is a multiple of the oscillation signal.

4. The apparatus of claim 1, wherein the apparatus is configured to synchronize a first ratio of a target sampling offset of a target sampling frequency to the sampling frequency offset of the sampling frequency and a second ratio of a second change in the first period to the first change in the channel time offset.

5. The apparatus of claim 1, wherein the circuitry of the sampling time offset estimator is further configured to accumulate the sampling time offset occurred during the first period, and to activate the first control signal when an accumulated sampling time offset exceeds a time offset compensation unit, and wherein the time control signal is activated based on an active state of the first control signal.

6. The apparatus of claim 1, wherein the circuitry of the sampling time offset estimator is further configured to activate the first control signal at a time point determined based on the sampling time offset and a time offset compensation unit, and wherein the time control signal is activated based on an active state of the first control signal.

7. The apparatus of claim 1, wherein the first period corresponds to one frame of a wireless communication system.

8. The apparatus of claim 1, wherein the circuitry of the channel time offset estimator is further configured to generate the second control signal for each of a second period, and the first period is shorter than the second period.

9. A method of wireless communication, the method comprising:
    estimating a sampling time offset caused by a sampling frequency of an input signal received through a wireless channel;
    estimating a channel time offset caused by the wireless channel;
    and compensating for a time offset of the input signal, based on the sampling time offset and the channel time offset, for time synchronization with a transmitter of the input signal,
    wherein the estimating of the sampling time offset comprises estimating the sampling time offset based on an offset of a carrier frequency for a frequency band shift of the input signal, or based on a change of the channel time offset,
    wherein the compensating for the time offset of the input signal comprises: compensating for the time offset of the input signal based on the sampling time offset for a first period;
    and compensating for the time offset based on the channel time offset for a second period, wherein the second period is longer than the first period.

10. The method of claim 9, wherein the estimating of the sampling time offset comprises: estimating a sampling frequency offset of the sampling frequency such that a first ratio of a target sampling frequency to the sampling frequency offset matches a second ratio of a target carrier frequency for a frequency band shift of the input signal to an offset of a carrier frequency; and determining the sampling time offset that occurred during the first period based on the sampling frequency offset.

11. The method of claim 9, wherein the estimating of the sampling time offset comprises: estimating a sampling frequency offset of the sampling frequency such that a first ratio of a target sampling frequency to the sampling frequency offset matches a second ratio of the first period to q change of the channel time offset during the first period; and determining the sampling time offset that occurred during the first period based on the sampling frequency offset.

12. An apparatus for wireless communication, the apparatus comprising:
   a time offset estimator comprising circuitry configured to determine an estimated sampling time offset caused by a sampling clock used to sample an input signal received through a wireless channel, to determine an estimated channel time offset caused by the wireless channel, and to generate a control signal based on the estimated sampling time offset and the estimated channel time offset;
   and a time offset compensator comprising circuitry configured to generate a time compensated signal by compensating for a time offset of the input signal, based on the control signal, for time synchronization with a transmitter that transmitted the input signal,
   wherein the circuitry of the time offset estimator is configured to determine the estimated sampling time offset based on an offset of a carrier frequency for a frequency band shift of the input signal, or based on a first change in a channel time offset caused by the wireless channel,
   wherein the circuitry of the time offset estimator comprises:
   a sampling time offset estimator comprising circuitry configured to determine the estimated sampling time offset and to generate a first control signal based on the estimated sampling time offset;
   a channel time offset estimator comprising circuitry configured to determine the estimated channel time offset and to generate a second control signal based on the estimated channel time offset;
   and a time control signal generator comprising circuitry configured to generate the control signal based on at least one from among the first control signal and the second control signal,
   and wherein the circuitry of the sampling time offset estimator is further configured to: determine an estimated sampling frequency offset of the sampling clock and to generate a sampling frequency offset signal based on the estimated sampling frequency offset;
   and determine the estimated sampling time offset based on the sampling frequency offset signal and generate the first control signal based on the estimated sampling time offset.

13. The apparatus of claim 12, wherein the circuitry of the time offset estimator is further configured to receive the time compensated signal generated by the time offset compensator, and to determine the estimated sampling time offset and the estimated channel time offset based the time compensated signal.

14. The apparatus of claim 12, wherein the circuitry of the sampling time offset estimator is further configured to determine the estimated sampling frequency offset of the sampling clock based on an offset of a carrier frequency for a frequency band shift of the input signal.

* * * * *